(12) United States Patent
Rink

(10) Patent No.: US 8,387,731 B2
(45) Date of Patent: Mar. 5, 2013

(54) CONTROL APPARATUS AND METHOD FOR OPERATING A COMBINED HYBRID DRIVE AND BRAKE SYSTEM

(75) Inventor: Steven C. Rink, Machesney Park, IL (US)

(73) Assignee: Parker-Hannifin Corporation, Cleveland, OH (US)

( * ) Notice: Subject to any disclaimer, the term of this patent is extended or adjusted under 35 U.S.C. 154(b) by 1143 days.

(21) Appl. No.: 12/229,728

(22) Filed: Aug. 26, 2008

(65) Prior Publication Data

US 2009/0062060 A1 Mar. 5, 2009

Related U.S. Application Data

(60) Provisional application No. 60/968,102, filed on Aug. 27, 2007.

(51) Int. Cl.
*B60W 20/00* (2006.01)
*B60K 5/00* (2006.01)
(52) U.S. Cl. .............. 180/65.275; 180/65.21; 180/301
(58) Field of Classification Search .......... 180/65.1, 180/65.21, 65.31, 65.245, 65.25, 65.27, 65.275, 180/65.28, 65.285; 477/3, 4, 52
See application file for complete search history.

(56) References Cited

U.S. PATENT DOCUMENTS

| | | | | |
|---|---|---|---|---|
| 4,741,410 A * | 5/1988 | Tunmore | ....................... | 180/165 |
| 5,024,489 A * | 6/1991 | Tanaka et al. | ..................... | 303/3 |
| 5,050,936 A * | 9/1991 | Tanaka et al. | ..................... | 303/3 |
| 5,086,865 A * | 2/1992 | Tanaka et al. | ................. | 180/165 |
| 5,088,041 A * | 2/1992 | Tanaka et al. | ................... | 701/70 |
| 6,170,587 B1 * | 1/2001 | Bullock | ....................... | 180/69.6 |
| 6,318,487 B2 * | 11/2001 | Yanase et al. | ............ | 180/65.245 |
| 6,459,980 B1 * | 10/2002 | Tabata et al. | .................... | 701/70 |
| 6,629,026 B1 * | 9/2003 | Baraszu et al. | ................. | 701/22 |
| 6,827,167 B2 * | 12/2004 | Cikanek et al. | ............. | 180/65.6 |
| 7,062,366 B2 * | 6/2006 | Dussapt et al. | ................. | 701/36 |
| 7,201,095 B2 * | 4/2007 | Hughey | ......................... | 91/408 |
| 7,689,341 B2 * | 3/2010 | Miller | ............................ | 701/70 |
| 7,913,791 B2 * | 3/2011 | Rose et al. | ..................... | 180/165 |
| 2006/0108860 A1 * | 5/2006 | Stragier | ......................... | 303/15 |
| 2010/0122864 A1 * | 5/2010 | Rosman | ....................... | 180/165 |

FOREIGN PATENT DOCUMENTS

| | | |
|---|---|---|
| DE | 4417335 A1 | 3/1995 |
| EP | 0366081 A2 | 5/1990 |
| WO | WO9847732 | 10/1998 |
| WO | WO2006017901 A1 | 2/2006 |

OTHER PUBLICATIONS

European Search Report Communication, Application No./Patent No. 08252836.5-2421/2030826 dated Apr. 12, 2009.

* cited by examiner

*Primary Examiner* — J. Allen Shriver, II
*Assistant Examiner* — James Triggs
(74) *Attorney, Agent, or Firm* — MacMillan, Sobanski & Todd, LLC

(57) ABSTRACT

A combined hybrid drive and brake system for use with a rotatably driven mechanism includes a hybrid drive system that is adapted to decelerate a rotatably driven mechanism, accumulate the energy resulting from such deceleration, and use the accumulated energy to subsequently accelerate the rotatably driven mechanism. A brake system is adapted to decelerate the rotatably driven mechanism. A control apparatus is responsive to a request for braking torque for decelerating the rotatably driven mechanism by either (1) the hybrid drive system operating alone, (2) the brake system operating alone, or (3) both the hybrid drive system and the brake system operating in combination.

20 Claims, 3 Drawing Sheets

CONTROL APPARATUS AND METHOD FOR OPERATING A COMBINED HYBRID DRIVE AND BRAKE SYSTEM

CROSS-REFERENCE TO RELATED APPLICATIONS

This application claims the benefit of U.S. Provisional Application No. 60/968,102, filed Aug. 27, 2007, the disclosure of which is incorporated herein by reference.

BACKGROUND OF THE INVENTION

This invention relates in general to hybrid drive systems, such as are used in conjunction with drive train systems for vehicles. In particular, this invention relates to an improved control apparatus and method for operating a combined hybrid drive and brake system in such a manner that transitions between various operating modes occur in a smooth and unnoticeable manner.

Drive train systems are widely used for generating power from a source and for transferring such power from the source to a driven mechanism. Frequently, the source generates rotational power, and such rotational power is transferred from the source of rotational power to a rotatably driven mechanism. For example, in most land vehicles in use today, an engine generates rotational power, and such rotational power is transferred from an output shaft of the engine through a driveshaft to an input shaft of an axle assembly so as to rotatably drive the wheels of the vehicle.

In some of these land vehicles and other mechanisms, a hybrid drive system (also known as an energy recovery system) is provided in conjunction with the drive train system to decelerate the rotatably driven mechanism, accumulate the energy resulting from such deceleration, and use the accumulated energy to subsequently accelerate the rotatably driven mechanism. To accomplish this, a typical hybrid drive system includes a reversible energy transfer machine that is coupled to the drive train system and an energy storage device that communicates with the reversible energy transfer machine. To decelerate the vehicle, the hybrid drive system is operated in a retarding mode, wherein the reversible energy transfer machine slows the rotation of the rotatably driven mechanism and stores the kinetic energy of the vehicle in the energy storage device as potential energy. To subsequently accelerate the vehicle, the hybrid drive system is operated in a driving mode, wherein the potential energy stored in the energy storage device is supplied to the reversible energy transfer machine to rotatably drive the rotatably driven mechanism.

Although hybrid drive systems of this general type function in an energy-efficient manner, it is often necessary or desirable to provide a separate brake system to affirmatively slow or stop the rotation of the rotatably driven mechanism in certain situations. For example, when used in conjunction with the drive train system of a vehicle that is relatively heavy or moving relatively fast, the hybrid drive system may not always have the capacity to adequately retard the rotation of the rotatably driven mechanism as quickly as requested by a driver. Additionally, when used in conjunction with the drive train system of a vehicle that is stopped on an inclined surface, the hybrid drive system cannot positively stop the rotatably driven mechanism to prevent any movement of the vehicle. To address these and other situations, the separate brake system (which can be embodied as a conventional pneumatically or hydraulically actuated friction brake system) is often provided in conjunction with the hybrid drive system. In such a combined hybrid drive and brake system, the hybrid drive system can be actuated to normally retard the rotation of the rotatably driven mechanism in the energy-efficient manner described above, and the brake system can be actuated when otherwise necessary.

In a combined hybrid drive and brake system such as described above, deceleration of the rotatably driven mechanism can be accomplished by either (1) the hybrid drive system operating alone, (2) the brake system operating alone, or (3) both the hybrid drive system and the brake system operating in combination. The selection of which of these three operating modes is appropriate can be determined by a control apparatus in accordance with a variety of parameters. Because these parameters can (and typically do) change during the deceleration of the rotatably driven mechanism, the control apparatus will frequently transition between two or more of the three operating modes of the combined hybrid drive and brake system. Thus, it would be desirable to provide an improved control apparatus and method for operating a combined hybrid drive and brake system in such a manner that the transitions between these various operating modes occur in a smooth and unnoticeable manner.

SUMMARY OF THE INVENTION

This invention relates to an improved control apparatus and method for operating a combined hybrid drive and brake system in such a manner that transitions between various operating modes occur in a smooth and unnoticeable manner. The combined hybrid drive and brake system includes a hybrid drive system that is adapted to decelerate a rotatably driven mechanism, accumulate the energy resulting from such deceleration, and use the accumulated energy to subsequently accelerate the rotatably driven mechanism. A brake system is adapted to decelerate the rotatably driven mechanism. A control apparatus is responsive to a request for braking torque for decelerating the rotatably driven mechanism by either (1) the hybrid drive system operating alone, (2) the brake system operating alone, or (3) both the hybrid drive system and the brake system operating in combination.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
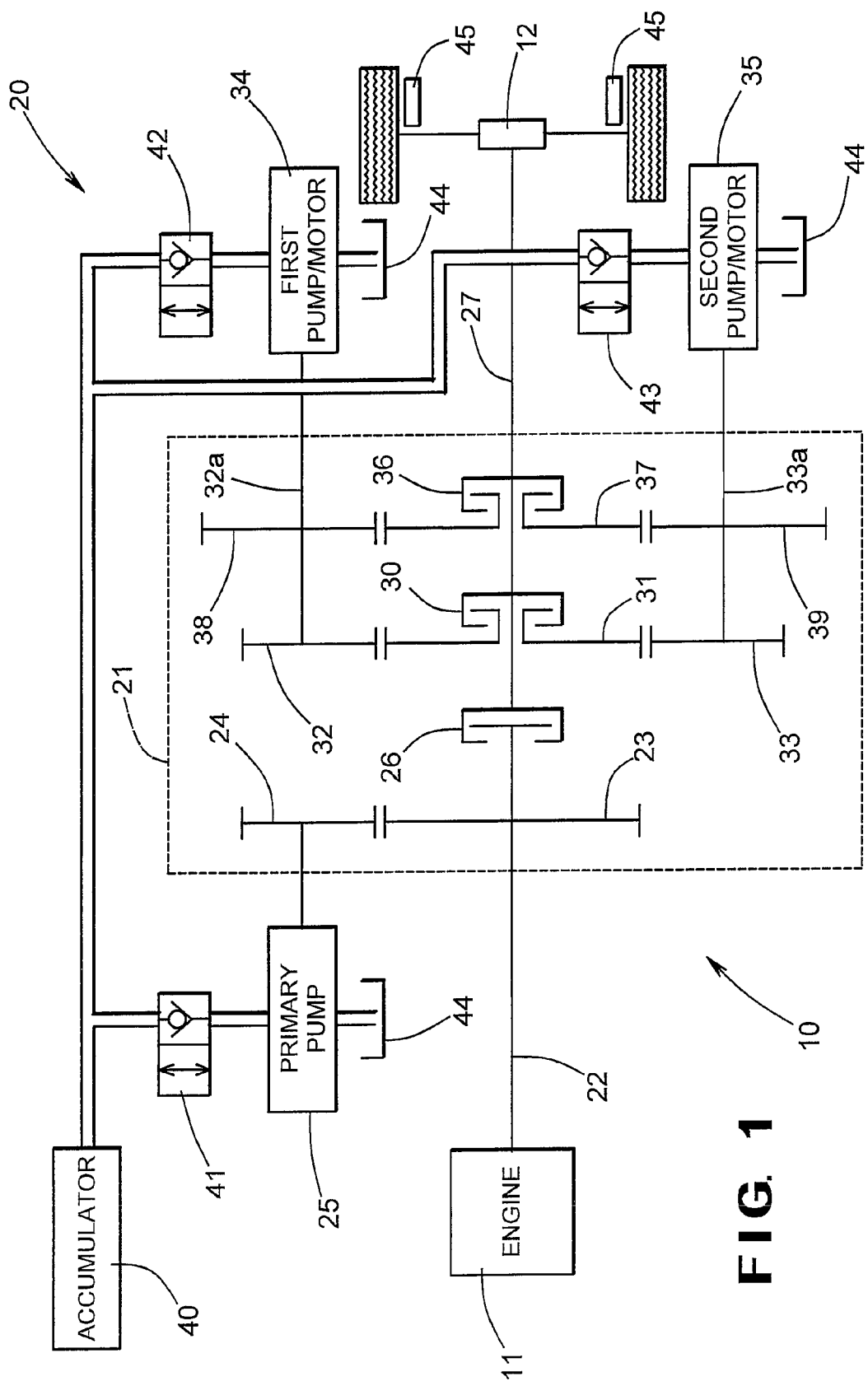
FIG. 1 is a schematic diagram of a drive train system including a combined hybrid drive and brake system in accordance with this invention.

Referring now to the drawings, there is illustrated in FIG. 1 a drive train system, indicated generally at 10, for generating power from a source and for transferring such power from the source to a driven mechanism. The illustrated drive train system 10 is a vehicular drive train system that includes an engine 11 that generates rotational power to an axle assembly 12 by means of a combined hybrid drive and brake system, indicated generally at 20. However, the illustrated vehicle drive train system 10 is intended merely to illustrate one environment in which this invention may be used. Thus, the scope of this invention is not intended to be limited for use with the specific structure for the vehicular drive train system 10 illustrated in FIG. 1 or with vehicle drive train systems in general. On the contrary, as will become apparent below, this invention may be used in any desired environment for the purposes described below.

The illustrated combined hybrid drive and brake system 20 includes a power drive unit 21 that is connected between the engine 11 and the axle assembly 12. The illustrated power drive unit 21 is, in large measure, conventional in the art and is intended merely to illustrate one environment in which this invention may be used. Thus, the scope of this invention is not intended to be limited for use with the specific structure for the power drive unit 21 illustrated in FIG. 1. The illustrated power drive unit 21 includes an input shaft 22 that is rotatably driven by the engine 11. An input gear 23 is supported on the input shaft 22 for rotation therewith. The input gear 23 is connected for rotation with a primary pump drive gear 24 that, in turn, is connected for rotation with an input shaft of a primary pump 25. Thus, the primary pump 25 is rotatably driven whenever the engine 11 is operated. The purpose of the primary pump 25 will be explained below.

The illustrated power drive unit 21 also includes a main drive clutch 26 that selectively connects the input shaft 22 to an output shaft 27. When the main drive clutch 26 is engaged, the input shaft 22 is connected for rotation with the output shaft 27. When the main drive clutch 26 is disengaged, the input shaft 22 is not connected for rotation with the output shaft 27. The output shaft 27 is connected for rotation with an input shaft of the axle assembly 12. Thus, the axle assembly 12 is rotatably driven by the engine 11 whenever the main drive clutch 26 is engaged.

The illustrated power drive unit 21 further includes a low drive clutch 30 that selectively connects the output shaft 27 to a low drive clutch gear 31. The low drive clutch output gear 31 is connected for rotation with both a first low drive output gear 32 and a second low drive output gear 33. The first low drive output gear 32 is connected for rotation with a first shaft 32a that, in turn, is connected for rotation with an input shaft of a first pump/motor 34. Similarly, the second low drive output gear 33 is connected for rotation with a second shaft 33a that, in turn, is connected for rotation with an input shaft of a second pump/motor 35. Thus, when both the main drive clutch 26 and the low drive clutch 30 are engaged, the output shaft 27 rotatably drives both the first pump/motor 34 and the second pump motor 35. The purpose for both the first pump/motor 34 and the second pump motor 35 will be explained below.

Similarly, the illustrated power drive unit 21 further includes a high drive clutch 36 that selectively connects the output shaft 27 to a high drive clutch gear 37. The high drive clutch output gear 37 is connected for rotation with both a first high drive output gear 38 and a second high drive output gear 39. The first high drive output gear 38 is connected for rotation with the first shaft 32a that, as mentioned above, is connected for rotation with the input shaft of the first pump/motor 34. Similarly, the second high drive output gear 39 is connected for rotation with the second shaft 33a that, as also mentioned above, is connected for rotation with the input shaft of the second pump/motor 35. Thus, when both the main drive clutch 26 and the high drive clutch 36 are engaged, the output shaft 27 rotatably drives both the first pump/motor 34 and the second pump motor 35. The low drive gears 31, 32, and 33 are selected to provide a relatively low gear ratio when the main drive clutch 26 and the low drive clutch 30 are engaged, in comparison with the relatively high gear ratio provided by the high drive gears 37, 28, and 39 when the main drive clutch 26 and the high drive clutch 36 are engaged.

The illustrated power drive unit 21 also includes an accumulator 40 or similar relatively high fluid pressure storage device. The accumulator 40 selectively communicates with a first port of the primary pump 25 through a primary pump valve 41. The primary pump valve 41 is conventional in the art and can be operated in a first position (shown in FIG. 1), wherein fluid communication from the accumulator 40 to the first port of the primary pump 25 is prevented and fluid communication from the first port of the primary pump 25 to the accumulator 40 is permitted. However, the primary pump valve 41 can be operated in a second position (to the right when viewing FIG. 1), wherein fluid communication from the accumulator 40 to the first port of the primary pump 25 is permitted and fluid communication from the first port of the primary pump 25 to the accumulator 40 is permitted. For the purposes of this invention, the primary pump valve 41 is always maintained in the illustrated first position, wherein fluid communication from the accumulator 40 to the first port of the primary pump 25 is prevented and fluid communication from the first port of the primary pump 25 to the accumulator 40 is permitted.

The accumulator 40 also selectively communicates with a first port of the first pump/motor 34 through a first control valve 42. The first control valve 42 is conventional in the art and can be operated in a first position (shown in FIG. 1), wherein fluid communication from the first port of the first pump/motor 34 to the accumulator 40 is permitted and fluid communication from the accumulator 40 to the first port of the first pump/motor 34 is prevented. However, the first control valve 42 can be operated in a second position (to the right when viewing FIG. 1), wherein fluid communication from the first port of the first pump/motor 34 to the accumulator 40 is permitted and fluid communication from the accumulator 40 to the first port of the first pump/motor 34 is permitted.

The accumulator 40 further selectively communicates with a first port of the second pump/motor 35 through a second control valve 43. The second control valve 43 is conventional in the art and can be operated in a first position (shown in FIG. 1), wherein fluid communication from the first port of the second pump/motor 35 to the accumulator 40 is permitted and fluid communication from the accumulator 40 to the first port of the second pump/motor 35 is prevented. However, the second control valve 43 can be operated in a second position (to the right when viewing FIG. 1), wherein fluid communication from the first port of the second pump/motor 35 to the accumulator 40 is permitted and fluid communication from the accumulator 40 to the first port of the second pump/motor 35 is permitted.

The illustrated power drive unit 21 further includes a reservoir 44 or similar relatively low fluid pressure storage device. Each of the primary pump 25, the first pump/motor 34, and the second pump/motor 35 includes a second port, and all of such second ports communicate with the reservoir 44 to draw fluid therefrom when necessary, as described below.

The basic operation of the drive train system 10 will now be described. When the engine 11 of the drive train system 10 is initially started, the main drive clutch 26, the low drive clutch 30, and the high drive clutch 36 are all disengaged, and the valves 41, 42, and 43 are all in their first positions illustrated in FIG. 1. In this initial condition, the engine 11 rotatably drives the primary pump 25 through the input shaft, the input gear 23, and the primary pump drive gear 24, as described above. As a result, the primary pump 25 draws fluid from the reservoir 44 through the second port thereof, and further supplies such fluid under pressure from the first port of the primary pump 25 through the primary pump valve 41 to the accumulator 40. As discussed above, the first and second control valves 42 and 43 prevent the pressurized fluid from the primary pump 25 or the accumulator 40 from being supplied to the first ports of the first and second pump/motors 34 and 35, respectively. Such initially operation continues until a sufficient amount of such pressurized fluid has been supplied to the accumulator 40. Because the main drive clutch 26, the low drive clutch 30, and the high drive clutch 36 are all disengaged, the engine 11 does not rotatably drive the output shaft 27 or the axle assembly 12 in this initial operation of the drive train system 10.

When it is desired to move the vehicle, the low drive clutch 30 is engaged, while the main drive clutch 26 and the high drive clutch 36 remain disengaged. As a result, the output shaft 27 is connected to the low drive clutch gear 31 for concurrent rotation. At the same time, the first control valve 42 and the second control valve 43 are each moved to their second positions. This permits pressurized fluid from the accumulator 40 to flow to the first ports of both the first pump/motor 34 and the second pump/motor 35. Lastly, the first and second pump/motors 34 and 35 are each placed in a positive displacement mode, wherein they function as motors to use the pressurized fluid supplied by the accumulator 40 to rotatably drive the first and second shafts 32a and 33a. In turn, this causes the low drive gears 31, 32, and 33 and the output shaft 27 to be rotatably driven. As a result, the axle assembly 12 is rotatably driven at the relatively low gear ratio provided by the low drive gears 31, 32, and 33. Such a relatively low gear ratio is well suited for providing the relatively high torque needed to accelerate the vehicle from a standstill.

Once it has begun to move, it may be desirable to move the vehicle at a higher speed that is suitable for the relatively low gear ratio provided by the low drive gears 31, 32, and 33. In this instance, the power drive unit 21 can be operated to disengage the low drive clutch 30 and engage the high drive clutch 36, while maintaining the main drive clutch 26 disengaged. As a result, the output shaft 27 is connected to the high drive clutch output gear 37 for concurrent rotation. The first control valve 42 and the second control valve 43 are each moved to (or maintained in) their second positions. As described above, this permits pressurized fluid from the accumulator 40 to flow to the first ports of both the first pump/motor 34 and the second pump/motor 35. As also described above, the first and second pump/motors 34 and 35 are each placed (or maintained) in a positive displacement mode, wherein they function as motors to use the pressurized fluid supplied by the accumulator 40 to rotatably drive the first and second shafts 32a and 33a. In turn, this causes the high drive gears 37, 38, and 39 and the output shaft 27 to be rotatably driven. As a result, the axle assembly 12 is rotatably driven at the relatively low gear ratio provided by the high drive gears 37, 38, and 39. Such a relatively high gear ratio is well suited for providing the relatively low torque needed to accelerate the vehicle to a relatively high speed.

If it is desired to operate the vehicle at a further higher speed, the power drive unit 21 can be operated to disengage the high drive clutch 36 and engage the main drive clutch 26, while the low drive clutch 30 remains disengaged. As a result, the output shaft 27 is connected to the input shaft 22 for concurrent rotation. At the same time, the first control valve 42 and the second control valve 43 are each moved to their first positions. As described above, this prevents pressurized fluid from the accumulator 40 from flowing to the outputs of both the first pump/motor 34 and the second pump/motor 35. As a result, the first and second pump/motors 34 and 35 are isolated from the drive train system 10.

Under certain circumstances, the above-described components of the combined hybrid drive and brake system 20 can also be used to slow or stop the movement of the vehicle. To accomplish this, the main drive clutch 26 and the low drive clutch 30 are disengaged, while the high drive clutch 36 is engaged (in some instances, it may be preferable that the main drive clutch 26 and the high drive clutch 36 be disengaged, while the low drive clutch 30 is engaged). Regardless, the first control valve 42 and the second control valve 43 are each moved to (or maintained in) their second positions. This permits pressurized fluid from the first ports of both the first pump/motor 34 and the second pump/motor 35 to flow to the accumulator 40. Lastly, the first and second pump/motors 34 and 35 are each placed in a negative displacement mode, wherein they function as pumps to use the rotational energy of the rotating output shaft 27 to supply pressurized fluid to the accumulator 40. As a result, the output shaft 27 rotates the high drive gears 37, 38, and 39, which causes the first pump/motor 34 and the second pump/motor 35 to be rotatably driven. Consequently, the rotation of the axle assembly 12 is decelerated as the kinetic energy thereof is stored as fluid pressure in the accumulator 40.

As discussed above, however, it is often necessary or desirable to provide a separate brake system to affirmatively slow or stop the rotation of the axle assembly 12. As shown in FIG. 1, such a separate brake system is provided within the axle assembly 12 of the illustrated drive train system 10 as a pair of friction brakes 45 associated with respective wheels of the vehicle. The friction brakes 45 are conventional in the art and may be actuated in any desired manner, such as pneumatically or hydraulically. The details regarding how the various components of the combined hybrid drive and brake system 20 are used to decelerate the vehicle will be explained in detail below.

In the illustrated combined hybrid drive and brake system 20, pressurized fluid is used as the actuating mechanism. In such a hydraulic hybrid drive system, the accumulator 40 functions as the energy storage device, and the pump/motors 34 and 35 function as reversible hydraulic machines. Another commonly known hybrid drive system uses electricity as the actuating mechanism. In such an electric hybrid drive system, an electrical energy storage device (such as a capacitor or a battery) and a reversible electrical machine (such as a generator/motor) are provided and function in a similar manner as described above. This invention is not intended to be limited to the specific structure of the hybrid drive and brake system, but rather is intended to cover any similar structures.

Figure 2:
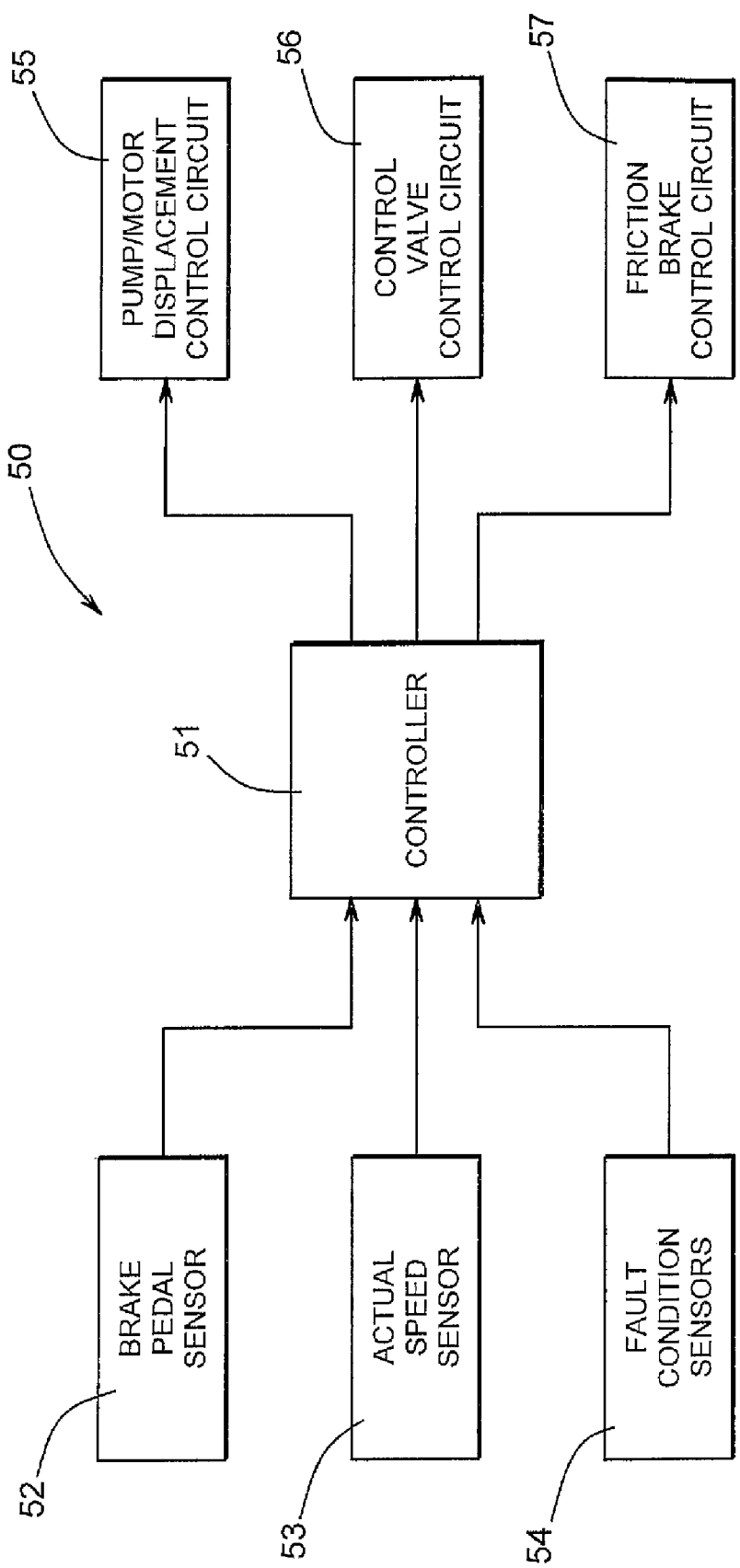
FIG. 2 is a block diagram of a control apparatus for operating the combined hybrid drive and brake system illustrated in FIG. 1.

FIG. 2 is a block diagram of a control apparatus, indicated generally at 50, for operating the combined hybrid drive and brake system 20 illustrated in FIG. 1. The illustrated control apparatus 50 includes a controller 51, which may be embodied as a conventional microprocessor or any other programmable control device. The controller 51 receives a first input signal from a brake pedal sensor 52 or other conventional device that generates a signal that is representative of the amount of braking torque that is requested by an operator of the drive train system 10. The controller 51 receives a second input signal from an actual speed sensor 53 or other conventional device that generates a signal that is representative of the actual speed of the drive train system 10. The controller 51 receives a third input signal from one or more fault condition sensors 54 or other conventional device that generates a signal that is representative of any desired operating condition of the drive train system 10 that is desired to be monitored. If desired, the controller 51 may receive one or more additional input signals representing any other condition or group of conditions that would be helpful in controlling the operation of the combined hybrid drive and brake system 20.

The controller 51 generates a first output signal to a pump/motor displacement control circuit 55 in response to one or more of the first, second, and third input signals. The pump/motor displacement control circuit 55 is conventional in the art and is adapted to vary the displacement of either or both of the pump/motors 34 and 35 in response to the first output signal. The controller 51 generates a second output signal to a control valve control circuit 56 in response to one or more of the first, second, and third input signals. The control valve control circuit 56 is conventional in the art and is adapted to control the movements of the first and second control valves 42 and 43 in response to the second output signal. The controller 51 generates a third output signal to a friction brake control circuit 57 in response to one or more of the first, second, and third input signals. The friction brake control circuit 57 is conventional in the art and is adapted to control the operation of the friction brakes 45 in response to the third output signal. If desired, the controller 51 may generate one or more additional output signals representing any other portion or portions of the combined hybrid drive and brake system 20 that is desired to be controlled.

Figure 3:
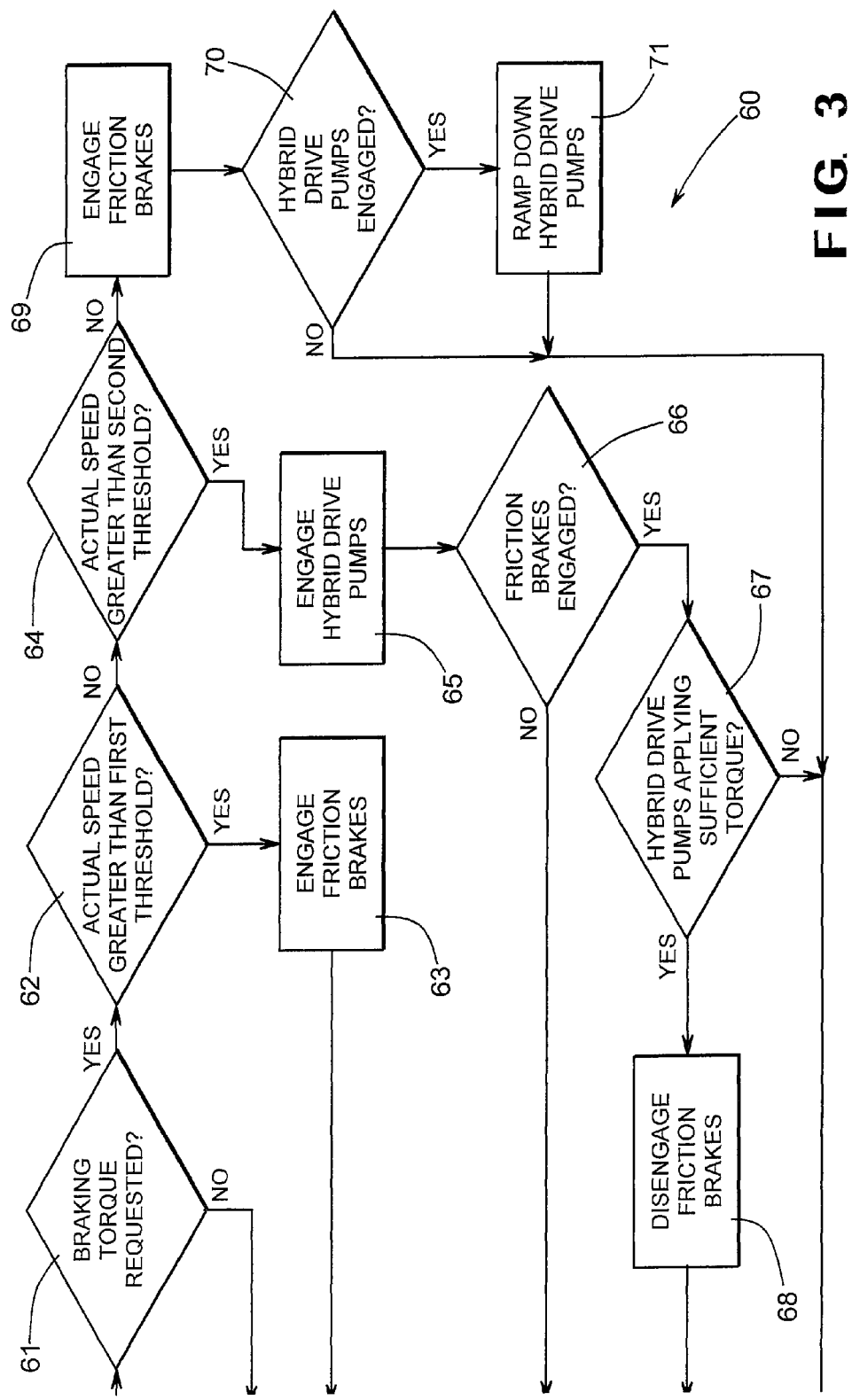
FIG. 3 is a flowchart of a method for operating the control apparatus illustrated in FIG. 2 in accordance with this invention.

FIG. 3 is a flowchart of a method, indicated generally at 60, for operating the control apparatus illustrated in FIG. 2 in accordance with this invention. In an initial decision point 61 of the method 60, it is determined whether a request for braking torque has been made by an operator of the drive train system 10. This determination can be made from the first input signal generated by the brake pedal sensor 52 discussed above. The method 60 repeats this initial decision point 61 until it is determined that such braking torque request has been made.

When a braking torque request has been made, the method 60 branches from the initial decision point 61 to a decision point 62, wherein it is determined whether the actual speed of the drive train system 10 is greater than a first predetermined threshold. Generally speaking, the first predetermined threshold is selected to represent a speed above which it is considered to be desirable to slow the rotation of the drive train system 10 solely by means of the friction brakes 45 described above and not by means of the first and second pump/motors 34 and 35 operating in the negative displacement mode, as described above. The first predetermined threshold can be characterized in any desired manner. For example, if the drive train system 10 is used in a vehicle, then the first predetermined threshold can be characterized as an actual speed of the vehicle. Also, the magnitude of this first predetermined threshold can be determined in accordance with specific parameters of the drive train system 10. For example, if the drive train system 10 is used in a relatively heavy vehicle, such as a garbage truck, then the magnitude of this first predetermined threshold can be set at seven miles per hour.

If the actual speed of the drive train system 10 is greater than the first predetermined threshold, then the method 60 branches from the decision point 62 to an instruction 63, wherein the controller 51 causes only the friction brakes 45 to be engaged to slow the rotation of the drive train system 10, as described above. Then, the method 60 returns to the initial decision point 61, wherein it is again determined whether a request for braking torque has been made by the operator of the drive train system 10.

If, on the other hand, the actual speed of the drive train system 10 is not greater than the first predetermined threshold, then the method 60 branches from the decision point 62 to a decision point 64, wherein it is determined whether the actual speed of the drive train system 10 is greater than a second predetermined threshold. Generally speaking, the second predetermined threshold is less than the first predetermined threshold and is selected to represent a speed above which it is desirable to slow the rotation of the drive train system 10 by means of the first and second pump/motors 34 and 35 operating in the negative displacement mode, as described above. The characterization and magnitude of the second predetermined threshold can be characterized in any desired manner, such as described above. For example, if the drive train system 10 is used in a relatively heavy vehicle, such as a garbage truck, then the magnitude of this second predetermined threshold can be set at five miles per hour.

If the actual speed of the drive train system 10 is greater than the second predetermined threshold, then the method 60 branches from the decision point 64 to an instruction 65, wherein the controller 51 causes the first and second pump/motors 34 and 35 to operate in the negative displacement mode, as described above. Then, the method 60 enters a decision point 66, wherein it is determined whether the friction brakes 45 are currently engaged. If not, then the method 60 returns to the initial decision point 61, wherein it is again determined whether a request for braking torque has been made by an operator of the drive train system 10. If, however, it is determined that the friction brakes 45 are currently engaged, then the method 60 branches from the decision point 66 to a further decision point 67, wherein it is determined whether the first and second pump/motors 34 and 35 (which are currently operating in the negative displacement mode, as described above) are applying sufficient braking torque to slow the rotation of the drive train system 10 as requested by the operator. This determination can be made in any desired manner including, for example, calculating the rate of deceleration from the actual speed signal as a function of time.

If it is determined that the first and second pump/motors 34 and 35 are applying sufficient torque to slow the rotation of the drive train system 10 as requested by the operator, then the method 60 branches from the decision point 67 to an instruction 68, wherein the friction brakes 45 are disengaged. In this transition from deceleration as a result of both the first and second pump/motors 34 and 35 and the friction brakes 45 to deceleration as a result of only the first and second pump/motors 34 and 35, it may be desirable to insure that deceleration occurs for a predetermined minimum amount of time as a result of both the first and second pump/motors 34 and 35 and the friction brakes 45. The amount of this predetermined minimum amount of time can be determined in any desired manner and may be based upon a variety of factors, including the weight of the vehicle and the like. The controller 51 can be easily programmed to accomplish this predetermined minimum amount of time before disengaging the friction brakes 45 in the instruction 68. Following this predetermined minimum amount of time, the deceleration of the drive train system 10 occurs solely as a result of the first and second pump/motors 34 and 35. This situation is desirable because it provides for maximum recovery of kinetic energy in the form of pressurized fluid in the accumulator 40.

If, on the other hand, it is determined that the first and second pump/motors 34 and 35 are not applying sufficient torque to slow the rotation of the drive train system 10 as requested by the operator, then the method 60 leaves the friction brakes 45 engaged and returns from the decision point 67 to the initial decision point 61, wherein it is again determined whether a request for braking torque has been made by the operator of the drive train system 10. Although less desirable from an energy recovery standpoint, this branch of the method 60 is necessary to insure that sufficient braking torque is applied to slow the rotation of the drive train system 10 as requested by the operator.

Referring back to the decision point 64, if it is determined that the actual speed of the drive train system 10 is not greater than a second predetermined threshold, then the method 60 branches from the decision point 64 to an instruction 69, wherein the controller 51 causes the friction brakes 45 to be engaged to slow the rotation of the drive train system 10, as described above. As mentioned above, the second predetermined threshold is less than the first predetermined threshold and is selected to represent a speed above which it is desirable to slow the rotation of the drive train system 10 by means of the first and second pump/motors 34 and 35 to operate in the negative displacement mode, as described above. The second predetermined threshold can also represent a speed below which it is desirable to slow the rotation of the drive train system 10 by means of the friction brakes 45 only, as also described above. Thus, the method 60 next enters a decision point 70, wherein it is determined whether the first and second pump/motors 34 and 35 are applying braking torque to slow the rotation of the drive train system 10. If not, then the method 60 returns to the initial decision point 61, wherein it is again determined whether a request for braking torque has been made by the operator of the drive train system 10.

If, however, it is determined that the first and second pump/motors 34 and 35 were previously engaged to apply braking torque to slow the rotation of the drive train system 10, then the method 60 branches from the decision point 70 to an instruction 71, wherein the controller 51 causes the first and second pump/motors 34 and 35 to be disengaged at a predetermined rate or over a predetermined period of time. This "ramp down" operation of the first and second pump/motors 34 and 35 can be accomplished in any desired manner including, for example, adjusting the displacement of the first and second pump/motors 34 and 35 from a negative magnitude to zero. The purpose of this "ramp down" disengagement of the first and second pump/motors 34 and 35 functions to gradually phase out the influence thereof on the deceleration of the drive train system 10 over a period of time and, as a result, avoid any relatively sudden change in the rate of deceleration that might be considered annoying to the operator. The amount of time that the first and second pump/motors 34 and 35 is to gradually phase out can be determined in any desired manner including, for example, in accordance with the weight of the vehicle on which the drive train system 10 is used. Thereafter, the method 60 returns to the initial decision point 61, wherein it is again determined whether a request for braking torque has been made by the operator of the drive train system 10.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A combined hybrid drive and brake system for use with a rotatably driven mechanism comprising:
   a hybrid drive system that is adapted to decelerate a rotatably driven mechanism, accumulate the energy resulting from such deceleration, and use the accumulated energy to subsequently accelerate the rotatably driven mechanism;
   a brake system that is adapted to decelerate the rotatably driven mechanism; and
   a control apparatus that is responsive to a request for braking torque for decelerating the rotatably driven mechanism by either (1) the hybrid drive system operating alone, (2) the brake system operating alone, or (3) both the hybrid drive system and the brake system operating in combination.

2. The combined hybrid drive and brake system defined in claim 1 wherein the control apparatus is responsive to the amount of braking torque that is requested for decelerating the rotatably driven mechanism by either (1) the hybrid drive system operating alone, (2) the brake system operating alone, or (3) both the hybrid drive system and the brake system operating in combination.

3. The combined hybrid drive and brake system defined in claim 1 wherein the control apparatus is responsive to a speed of the rotatably driven mechanism for decelerating the rotatably driven mechanism by either (1) the hybrid drive system operating alone, (2) the brake system operating alone, or (3) both the hybrid drive system and the brake system operating in combination.

4. The combined hybrid drive and brake system defined in claim 3 wherein the control apparatus decelerates the rotatably driven mechanism by the brake system operating alone when the speed of the rotatably driven mechanism is greater than a first threshold and by the hybrid drive system operating alone when the speed of the rotatably driven mechanism is lower than the first threshold.

5. The combined hybrid drive and brake system defined in claim 3 wherein the control apparatus decelerates the rotatably driven mechanism by the brake system operating alone when the speed of the rotatably driven mechanism is greater than a first threshold, by both the hybrid drive system and the brake system operating in combination for a predetermined period of time when the speed of the rotatably driven mechanism falls below the first threshold, and by the hybrid drive system operating alone when the speed of the rotatably driven mechanism is lower than the first threshold after the predetermined period of time.

6. The combined hybrid drive and brake system defined in claim 3 wherein the control apparatus decelerates the rotatably driven mechanism by the brake system operating alone when the speed of the rotatably driven mechanism is greater than a first threshold, by the hybrid drive system operating alone when the speed of the rotatably driven mechanism is lower than the first threshold and greater than a second threshold, and by the brake system operating alone when the speed of the rotatably driven mechanism is less than the second threshold.

7. The combined hybrid drive and brake system defined in claim 6 wherein the control apparatus decelerates the rotatably driven mechanism by the brake system operating alone when the speed of the rotatably driven mechanism is greater than a first threshold, by both the hybrid drive system and the brake system operating in combination for a predetermined period of time when the speed of the rotatably driven mechanism falls below the first threshold, and by the hybrid drive system operating alone when the speed of the rotatably driven mechanism is lower than the first threshold after the predetermined period of time.

8. The combined hybrid drive and brake system defined in claim 6 wherein the control apparatus decelerates the rotatably driven mechanism by the hybrid drive system operating alone when the speed of the rotatably driven mechanism is less than the first threshold and greater than the second threshold, by both the hybrid drive system and the brake system operating in combination for a predetermined period of time when the speed of the rotatably driven mechanism falls below the second threshold, and by the brake system operating alone when the speed of the rotatably driven mechanism is lower than the second threshold after the predetermined period of time.

9. The combined hybrid drive and brake system defined in claim 8 wherein while both the hybrid drive system and the brake system are operating in combination, the control apparatus reduces the operation of the hybrid drive system at a predetermined rate.

10. The combined hybrid drive and brake system defined in claim 1 wherein the control apparatus is responsive to both the amount of braking torque that is requested and to a speed of the rotatably driven mechanism for decelerating the rotatably driven mechanism by either (1) the hybrid drive system operating alone, (2) the brake system operating alone, or (3) both the hybrid drive system and the brake system operating in combination.

11. A method of operating a combined hybrid drive and brake system for use with a rotatably driven mechanism comprising the steps of:
   (a) providing a hybrid drive system that is adapted to decelerate a rotatably driven mechanism, accumulate the energy resulting from such deceleration, and use the accumulated energy to subsequently accelerate the rotatably driven mechanism;
   (b) providing a brake system that is adapted to decelerate the rotatably driven mechanism; and
   (c) operating a control apparatus in response to a request for braking torque for decelerating the rotatably driven mechanism by either (1) the hybrid drive system operating alone, (2) the brake system operating alone, or (3) both the hybrid drive system and the brake system operating in combination.

12. The method defined in claim 11 wherein the control apparatus is responsive to the amount of braking torque that is requested for decelerating the rotatably driven mechanism by either (1) the hybrid drive system operating alone, (2) the brake system operating alone, or (3) both the hybrid drive system and the brake system operating in combination.

13. The method defined in claim 11 wherein the control apparatus is responsive to a speed of the rotatably driven mechanism for decelerating the rotatably driven mechanism by either (1) the hybrid drive system operating alone, (2) the brake system operating alone, or (3) both the hybrid drive system and the brake system operating in combination.

14. The method defined in claim 13 wherein the control apparatus decelerates the rotatably driven mechanism by the brake system operating alone when the speed of the rotatably driven mechanism is greater than a first threshold and by the hybrid drive system operating alone when the speed of the rotatably driven mechanism is lower than the first threshold.

15. The method defined in claim 13 wherein the control apparatus decelerates the rotatably driven mechanism by the brake system operating alone when the speed of the rotatably driven mechanism is greater than a first threshold, by both the hybrid drive system and the brake system operating in combination for a predetermined period of time when the speed of the rotatably driven mechanism falls below the first threshold, and by the hybrid drive system operating alone when the speed of the rotatably driven mechanism is lower than the first threshold after the predetermined period of time.

16. The method defined in claim 13 wherein the control apparatus decelerates the rotatably driven mechanism by the brake system operating alone when the speed of the rotatably driven mechanism is greater than a first threshold, by the hybrid drive system operating alone when the speed of the rotatably driven mechanism is lower than the first threshold and greater than a second threshold, and by the brake system operating alone when the speed of the rotatably driven mechanism is less than the second threshold.

17. The method defined in claim 16 wherein the control apparatus decelerates the rotatably driven mechanism by the brake system operating alone when the speed of the rotatably driven mechanism is greater than a first threshold, by both the hybrid drive system and the brake system operating in combination for a predetermined period of time when the speed of the rotatably driven mechanism falls below the first threshold, and by the hybrid drive system operating alone when the speed of the rotatably driven mechanism is lower than the first threshold after the predetermined period of time.

18. The method defined in claim 16 wherein the control apparatus decelerates the rotatably driven mechanism by the hybrid drive system operating alone when the speed of the rotatably driven mechanism is less than the first threshold and greater than the second threshold, by both the hybrid drive system and the brake system operating in combination for a predetermined period of time when the speed of the rotatably driven mechanism falls below the second threshold, and by the brake system operating alone when the speed of the rotatably driven mechanism is lower than the second threshold after the predetermined period of time.

19. The method defined in claim 18 wherein while both the hybrid drive system and the brake system are operating in combination, the control apparatus reduces the operation of the hybrid drive system at a predetermined rate.

20. The method defined in claim 11 wherein the control apparatus is responsive to both the amount of braking torque that is requested and to a speed of the rotatably driven mechanism for decelerating the rotatably driven mechanism by either (1) the hybrid drive system operating alone, (2) the brake system operating alone, or (3) both the hybrid drive system and the brake system operating in combination.

* * * * *